(12) United States Patent
Sweis

(10) Patent No.: US 7,934,201 B2
(45) Date of Patent: Apr. 26, 2011

(54) SYSTEM, METHOD, AND COMPUTER READABLE MEDIUM FOR UNIVERSAL SOFTWARE TESTING

(75) Inventor: Faris Sweis, Austin, TX (US)

(73) Assignee: ArtofTest, Inc., Austin, TX (US)

( * ) Notice: Subject to any disclaimer, the term of this patent is extended or adjusted under 35 U.S.C. 154(b) by 1169 days.

(21) Appl. No.: 11/598,519

(22) Filed: Nov. 13, 2006

(65) Prior Publication Data

US 2008/0092119 A1   Apr. 17, 2008

Related U.S. Application Data

(60) Provisional application No. 60/852,314, filed on Oct. 17, 2006.

(51) Int. Cl.
*G06F 9/44* (2006.01)
*G06F 11/00* (2006.01)
(52) U.S. Cl. .......................................... 717/124; 714/38
(58) Field of Classification Search .......... 717/124–135; 714/38, 100
See application file for complete search history.

(56) References Cited

U.S. PATENT DOCUMENTS

| | | | | |
|---|---|---|---|---|
| 5,394,347 A * | 2/1995 | Kita et al. | | 703/2 |
| 5,758,061 A | 5/1998 | Plum | | |
| 6,671,874 B1 * | 12/2003 | Passova | | 717/126 |
| 7,093,238 B2 | 8/2006 | Givoni et al. | | |
| 7,299,385 B2 * | 11/2007 | Voigt | | 714/57 |
| 7,346,486 B2 * | 3/2008 | Ivancic et al. | | 703/22 |
| 7,490,319 B2 | 2/2009 | Blackwell et al. | | |
| 2002/0162091 A1 * | 10/2002 | Crocker | | 717/126 |
| 2003/0208351 A1 * | 11/2003 | Hartman et al. | | 717/131 |
| 2006/0064399 A1 | 3/2006 | De Sio | | |
| 2007/0022407 A1 | 1/2007 | Givoni et al. | | |
| 2007/0061350 A1 * | 3/2007 | Thompson et al. | | 707/101 |
| 2007/0168970 A1 | 7/2007 | Li et al. | | |

OTHER PUBLICATIONS

Grieskamp et al., "Generating Finite State Machines from Abstract State Machines", ACM, 2002, 11pg.*
Holzmann et al., "Software model checking: extracting verification models from source code"; Soft. Test. Verif. Reliab., 2001, p. 65-79.*
Richardson et al., "Software Testing at the Architectural Level"; ACM, 1996, 4pg.*

(Continued)

*Primary Examiner* — Wei Y Zhen
*Assistant Examiner* — Ryan D Coyer
(74) *Attorney, Agent, or Firm* — Bracewell & Giuliani LLP

(57) ABSTRACT

An automated software testing and validation system allows testing of a software application under test (SAUT) regardless of the dynamic nature of the SAUT. An abstracted set of hierarchal or linear objects model certain regions of the SAUT. Automated test scripts utilize theses regions to intuitively navigate and identify potions of the SAUT to automate. The scripts can also access specific SAUT elements contain within each defined region. These elements can then be used to invoke actions or verify outputs there from. The system uses a set of rich identification rules embodied in the system which allow the user to configure the identification of any element within the abstracted region. The rules are customizable to allow the user to configure the desired level of loose coupling between the automated scripts and the target element to adapt the scripts to the nature of the SAUT.

21 Claims, 8 Drawing Sheets

OTHER PUBLICATIONS

International Search Report and Written Opinion dated Jan. 28, 2009, pp. 13.

Kapfhammer, G., "A Comprehensive Framework for Testing Database-Centric Software Applications," University of Pittsburgh Thesis, Apr. 19, 2007, Retrieved from Internet. <URL: http://challenger.library.pitt.edu/ETD/available/etd-03282007-170919/unrestricted/kapfhammer_disertation_final_April_2007.pdf>, 253 pages.

SW Explorer Automation, What is SW Explorer automation?, http://home.comcast.net/~furmana/SWIEAutomation.htm, Internet printout Nov. 10, 2006, 2 pages.

* cited by examiner

```
1  <html xmins="http://www.w3.org/1999/xhtml">
2  <head>
3     <title>Sample 1<title>
4  <head>
5  <body>
6  <script>
7  function showclick0
8  {
9     myLabel.innerText = myText.value;
10 }
11 </script>
12       <label>Hello</label>
13       <input type="text" id="myText"></input>
14       <input type="button" onclick="showclick()"></input>
15       <label>Hi there</label>
16       <label id="myLabel"></label>
17 </body>
18 </html>
19
20
```

```
 1  <html xmins="http://www.w3.org/1999/xhtml">
 2  <testregion id="MyApplication">
 3  <head>
 4     <title>Sample 1 <title>
 5  <head>
 6  <body>
 7  <script>
 8  function showclick()
 9  {
10     myLabel.innerText = myText.value;
11  }
12  </script>
13  <testRegion id="Login">
14     <label>Hello</label>
15     <input type="text" id="myText" testObject="LoginName"></input>
16     <input type="button" testObject="LoginButton" onclick="showclick()"></input>
17  </testRegion>
18  <testRegion id="DataDisplay">
19     <label>Hi there</label>
20     <label id="myLabel"testObject="Verify Data"></label>
21  </testRegion>
22  </body>
23  </testregion>
24  </html>
25
```

Abstractions:
- My Application
- Login
- Data Display

*FIG. 3*

```
1  <html xmins="http://www.w3.org/1999/xhtml">
2  <!--testregion id="MyApplication"-->
3  <head>
4     <title>Sample 1<title>
5  <head>
6  <body>
7  <script>
8  function showclick()
9  {
10 myLabel.innerText = myText.value;
11 }
12 </script>
13    <!--testRegion id="Login"-->
14       <label>Hello</label>
15       <input type="text" id="myText"></input>
16        <input type="button" onclick="showclick()"></input>
17    <!--/testRegion-->
18    <!--/testRegion id="DataDisplay"-->
19       <label>Hi there</label>
20       <label id="myLabel"></label>
21    <!--/testregion-->
22 </body>
23 <!--/testregion-->
24 </html>
25
```

*FIG. 4*

```
1   <testregion id="myCalendar">
2   0 <table id="myCalender" cellspacing="0" cellpadding="2" title="Calendar" border= "0" style= "border-width:1px;border-style:solid;border-collapse:collapse;">
3       0 <tr>
4           <td colspan="7" style="background-color:Silver;">
5               <table cellspacing="0" border="0" style="width:100%;border-collapse:collapse;">
6                   <tr>
7                       <td style="width:15%;">
8                           <a herf="javascript:  doPostBack('myCalander','V2435')" style="color:Black"title="Go to the previous month"><</a>
9                       </td>
10                      <td align="center" style="width:70%;">October 2006</td>
11                      <td align="right" style="width:15%;">
12                          <a herf="javascript:  doPostBack('myCalander','V2496')"style="color:Black"title=" Go to the next month">></a>
13                      </td>
14                  </tr>
15              </table>
16          </td>
17      </tr>
18      1<tr>
19          <th align="center" abbr="Sunday" scope="col">Sun</th>
20          <th align="center" abbr="Monday" scope="col">Mon</th>
21          <th align="center" abbr="Tuesday" scope="col">Tue</th>
22          <th align="center" abbr="Wednesday" scope="col">Wed</th>
23          <th align="center" abbr="Thursday" scope="col">Thu</th>
24          <th align="center" abbr="Friday" scope="col">Fri</th>
25          <th align="center" abbr="Saturday" scope="col">Sat</th>
26      </tr>
27      2<tr>
28          0 <td align="center" style="width:14%;"><a herf="javascript:  doPostBack('myCalander','2458')"style="color:Black"title="September 24">24< /a></td>
29          1 <td align="center" style="width:14%;"><a herf="javascript:  doPostBack('myCalander','2459')"style="color:Black"title="September 25">25< /a></td>
30          2 <td align="center" style="width:14%;"><a herf="javascript:  doPostBack('myCalander','2460')"style="color:Black"title="September 26">26< /a></td>
31          3 <td align="center" style="width:14%;"><a herf="javascript:  doPostBack('myCalander','2461')"style="color:Black"title="September 27">27< /a></td>
32          4 <td align="center" style="width:14%;"><a herf="javascript:  doPostBack('myCalander','2462')"style="color:Black"title="September 28">28< /a></td>
33          5 <td align="center" style="width:14%;"><a herf="javascript:  doPostBack('myCalander','2463')"style="color:Black"title="September 29">29< /a></td>
34          6 <td align="center" style="width:14%;"><a herf="javascript:  doPostBack('myCalander','2464')"style="color:Black"title="September 30">30< /a></td>
35      </tr>                                             0
36      <tr>
37          <td align="center" style="width:14%;"><a herf="javascript:  doPostBack('myCalander','2465')"style="color:Black"title="October 01">1< /a></td>
38          <td align="center" style="width:14%;"><a herf="javascript:  doPostBack('myCalander','2466')"style="color:Black"title="October 02">2< /a></td>
39          <td align="center" style="width:14%;"><a herf="javascript:  doPostBack('myCalander','2467')"style="color:Black"title="October 03">3< /a></td>
40          <td align="center" style="width:14%;"><a herf="javascript:  doPostBack('myCalander','2468')"style="color:Black"title="October 04">4< /a></td>
41          <td align="center" style="width:14%;"><a herf="javascript:  doPostBack('myCalander','2469')"style="color:Black"title="October 05">5< /a></td>
42          <td align="center" style="width:14%;"><a herf="javascript:  doPostBack('myCalander','2470')"style="color:Black"title="October 06">6< /a></td>
43          <td align="center" style="width:14%;"><a herf="javascript:  doPostBack('myCalander','2471')"style="color:Black"title="October 07">7< /a></td>
44      </tr>
45          .... content removed ....
46  </table>
47  </testregion>
```

*FIG. 8*

```
1   <testregion id="myCalendar">
2       <table id="myCalender" cellspacing="0" cellpadding="2" title="Calendar" border= "0" style= "border-width:1px;border-style:solid;border-collapse:collapse;">
3           <tr>
4               <td colspan="7" style="background-color:Silver;">
5                   <table cellspacing="0" border="0" style="width:100%;border-collapse:collapse;">
6                       <tr>
7                           <td style="width:15%;">
8                               0 <a herf="javascript:__doPostBack('myCalander','V2435')" style="color:Black"title="Go to the previous month"><</a>
9                           </td>
10                          <td align="center" style="width:70%;">October 2006</td>
11                          <td align="right" style="width:15%;">
12                              1 <a herf="javascript:__doPostBack('myCalander','V2496')"style="color:Black"title=" Go to the next month">></a>
13                          </td>
14                      </tr>
15                  </table>
16              </td>
17          </tr>
18          <tr>
19              <th align="center" abbr="Sunday" scope="col">Sun</th>
20              <th align="center" abbr="Monday" scope="col">Mon</th>
21              <th align="center" abbr="Tuesday" scope="col">Tue</th>
22              <th align="center" abbr="Wednesday" scope="col">Wed</th>
23              <th align="center" abbr="Thursday" scope="col">Thu</th>
24              <th align="center" abbr="Friday" scope="col">Fri</th>
25              <th align="center" abbr="Saturday" scope="col">Sat</th>
26          </tr>
27          </tr>
28              <td align="center" style="width:14%;"2><a herf="javascript:__doPostBack('myCalander','2458')"style="color:Black"title="September 24">24< /a></td>
29              <td align="center" style="width:14%;"3><a herf="javascript:__doPostBack('myCalander','2459')"style="color:Black"title="September 25">25< /a></td>
30              <td align="center" style="width:14%;"4><a herf="javascript:__doPostBack('myCalander','2460')"style="color:Black"title="September 26">26< /a></td>
31              <td align="center" style="width:14%;"5><a herf="javascript:__doPostBack('myCalander','2461')"style="color:Black"title="September 27">27< /a></td>
32              <td align="center" style="width:14%;"6><a herf="javascript:__doPostBack('myCalander','2462')"style="color:Black"title="September 28">28< /a></td>
33              <td align="center" style="width:14%;"7><a herf="javascript:__doPostBack('myCalander','2463')"style="color:Black"title="September 29">29< /a></td>
34              <td align="center" style="width:14%;"8><a herf="javascript:__doPostBack('myCalander','2464')"style="color:Black"title="September 30">30< /a></td>
35          </tr>
36          <tr>
37              <td align="center" style="width:14%;"><a herf="javascript:__doPostBack('myCalander','2465')"style="color:Black"title="October 01">1< /a></td>
38              <td align="center" style="width:14%;"><a herf="javascript:__doPostBack('myCalander','2466')"style="color:Black"title="October 02">2< /a></td>
39              <td align="center" style="width:14%;"><a herf="javascript:__doPostBack('myCalander','2467')"style="color:Black"title="October 03">3< /a></td>
40              <td align="center" style="width:14%;"><a herf="javascript:__doPostBack('myCalander','2468')"style="color:Black"title="October 04">4< /a></td>
41              <td align="center" style="width:14%;"><a herf="javascript:__doPostBack('myCalander','2469')"style="color:Black"title="October 05">5< /a></td>
42              <td align="center" style="width:14%;"><a herf="javascript:__doPostBack('myCalander','2470')"style="color:Black"title="October 06">6< /a></td>
43              <td align="center" style="width:14%;"><a herf="javascript:__doPostBack('myCalander','2471')"style="color:Black"title="October 07">7< /a></td>
44          </tr>
45          .... content removed ....
46      </table>
47  </testregion>
```

*FIG. 9*

SYSTEM, METHOD, AND COMPUTER READABLE MEDIUM FOR UNIVERSAL SOFTWARE TESTING

CROSS-REFERENCE TO RELATED APPLICATION

This is a non-provisional patent application which claims priority to and the benefit of U.S. Provisional Patent Application Ser. No. 60/852,314, filed Oct. 17, 2006, entitled "SOFTWARE SYSTEM AND METHOD TO ABSTRACT MARKUP APPLICATIONS FOR EXPEDITING TEST SCRIPT AUTHORING AND LOOSELY COUPLING SCRIPTS FROM THE APPLICATION UNDER TEST," which is incorporated herein by reference in its entirety.

BACKGROUND

1. Field of the Invention

This invention relates in general to software testing, and in particular to abstracting markup applications in order to expedite and render software testing more flexible and efficient.

2. Description of the Prior Art

Software has become an essential part of everyday life worldwide. Many businesses and individuals relay on software to support their daily activities. The quality and reliability of software has never been as important and critical as it is today. Software providers, whether they provide packaged software products or customized solutions sold to businesses, consider the quality of the software they sell a very serious matter. Software defects can severely jeopardize their entire business, especially given the reality that these defects can detrimentally impact customer loyalty and trust.

There are many categories of software applications developed today. One type of application is the markup base application. These applications are defined using markup languages such as, for example, HTML, XHTML, XML, or other similar markup languages. These applications are interpreted using a host that provides the user with elements which the user can use to interact with the application logic. A classic example of these types of applications is a web application. Web applications run in a host like Microsoft's Internet Explorer™ or Mozilla's FireFox™ and interpret an HTML document to present it to the user for interaction.

Many software development companies test their software by compiling a list of test scripts (i.e., test scenarios or test cases) which are run against their software to ensure its quality and to validate its design. A test script must be created for each piece of software to be tested. Some companies hire employees or contractors to run the test manually, while others invest in automating the tests in order to avoid the additional costs associated with the manual labor. There are many advantages to test automation, with a few worth noting such as: 1) automation cuts the costs associated with manual execution, 2) automation cuts down on the execution time, which allows for faster turn around on results, and 3) automation allows for more accurate and consistent results.

With regard to generating automated test scripts for such markup applications, there are increasing challenges and pressures to enhance the efficiency and quality associated with building the test scripts; especially with the increasingly rich content on the web and the wide spread use of dynamic web content, such as ASP.NET or PHP. Some of the key challenges are summarized in the following paragraphs.

First, the ease of building and crafting automated tests which perform the desired tasks is a challenge. Here, in order to execute actions against the software or to verify its content, it would be very beneficial if one could easily and consistently identify elements within the complex markup of the software application under test (i.e., SAUT). For example, some application's output dynamically changes between requests and within the same session. Other applications generate dynamic content with variable element IDs which make it difficult to consistently identify the elements. Moreover, such an environment makes it difficult to automate the test scripts against the application throughout the development cycle.

Second, maintenance and updatability of automated test scripts is a challenge. Depending on how the automated tests are authored, changes to the SAUT can break the functionality of the test scripts because they are unable to adapt to the nature of the SAUT. This, in turn, adds additional costs to repairing and updating the tests throughout the life cycle of the application and throughout the different future version releases of the application.

There are currently several products on the market that attempt to address the above challenges of automated testing for SAUT, such as, for example QuickTest™ and WinRunner™, which are marketed by Mercury Interaction®. Although these tools have a record and replay functionality to easily craft automated test scripts, they provide little support to help solve the need for flexible identification of elements and loose coupling of test scripts within the SAUT. Thus, each falls short in addressing the maintenance nightmare that comes with such testing solutions. In fact, due to dynamic changes in the software which require re-recording of the scripts from scratch, record and replay testing is one of the most expensive automated testing techniques.

Some other tools like TestComplete™ marketed commercially by AutomatedQA™, attempt to record at the elemental level. This, however, enhances the resilience of the tests, but falls short of addressing issues related to the dynamic nature of certain elements and elements that do not have consistent properties between users or requests. For example, most markup applications use two very popular methods to identify elements (especially for non-uniform markups like HTML). The first is an element ID or name which defines the element and is globally unique within the SAUT. The second is an element tag name occurrence, which is the occurrence index of a specific tag in the order of the elements appearance within the SAUT.

Information regarding the tag's occurrence or element ID and name is supported by most tools used today. These tools help identify and locate application elements for the automated test scripts. Automated tools like the prior art described above record this information and store it as part of the automated test script to be used later when the script is executed. Although this approach can help in many cases, because its static, it still falls short when the order of elements or the tag's occurrence is dynamic and changes based upon data entered by a user. A good example of this is a table cell in an HTML table. Depending on what data is requested by the user, there might be one cell or multiple cells in a table and, thus, hard coding any specific tag occurrence or element ID is not feasible. In addition to that, dynamic languages like ASP.NET, generate rich content where users in some cases have no control over the attributes of the elements being emitted. For example, ASP.NET has a calendar control which outputs a very complex set of markups that a user cannot control by annotating the elements with IDs or names.

To improve test automation, however, there is a need for adaptable and dependable tools that enable one to more efficiently automate the scenarios that one's software performs in order to generate the automated test scripts. This need has been the key catalyst for innovations in the software development lifecycle and, more specifically, in how software is tested throughout the life cycle. In addition, there is increasing pressure for companies to produce software faster and with lower development and maintenance costs.

Companies have started addressing some of these issues by using abstracted layers that model their specific SAUT built on the top of their automation infrastructure. Automated test scripts go through these abstracted layers to access elements within the application. In the event of a maintenance issue, the use of the abstract model allows the script developer to fix the abstracted layer instead of fixing thousands of automated tests. Although useful, the abstract layers of the prior art are hard coded to the specific SAUT. Thus, when any changes are made to the SAUT, the abstract models are rendered useless in most cases. This results in higher development costs due to the constant maintenance required to keep the models in sync with the SAUT. As such, the inventor of the present invention has realized the need for a new and improved method of automated testing which addresses these shortcomings of the prior art.

SUMMARY OF THE INVENTION

In view of the foregoing, embodiments of the present invention beneficially provide systems, program products, methods, and computer readable media which facilitate software testing and validation. Embodiments of systems, program products, methods, and computer readable media of the present invention advantageously allow users of such to utilize abstract models of a software application under test (i.e., SAUT) to test and validate various regions of the SAUT regardless of the dynamic nature of the SAUT.

More particularly, an embodiment of the present invention provides a method, system, and computer readable medium for software testing and validation including the computer implemented steps of: identifying a SAUT; generating, from the SAUT, an abstract model of at least one region of the SAUT, the abstract model including data which allows a test script to adapt to the nature of the SAUT; and testing the at least one region of the SAUT with the test script, wherein the test script utilizes the abstract model to conduct the testing.

The present invention provides an abstracted set of hierarchal or linear objects that model certain regions of a software application under test, such as, for example, a markup language (i.e., a web application running in a browser or an XML defined application running in a custom host). Automated test scripts can utilize these abstracted regions to help intuitively navigate and identify segments of the SAUT for both action invocation and verification of outputs and data structures.

The abstracted regions are defined and scoped with the SAUT using customizable tags. Each tag defined within the SAUT is independently discoverable using its global unique identifier. Users can define nested objects depending on the need and the design of the SAUT the level of abstract layering the user's desires to achieve. The system's parser automatically builds the abstracted model directly from the SAUT and the test scripts can immediately access them. The abstraction layer is implied directly from the SAUT itself without the need and additional cost of building peripheral abstraction layers in the external test automation framework being used.

In addition to using the abstracted model to help navigate the SAUT, the automated test scripts can also access specific SAUT elements contained within each region. These elements can then be used to invoke actions on or verify the outputs that persist in the SAUT. The system also uses a set of rich identification rules embodied in the system that allow the user to configure the identification of any element within the abstract region. The rules also allow the user to configure the desired level of loose coupling of the automated test script to the target element being automated based upon the complexity and design of the SAUT. Additionally, the location of these elements can be identified using a predefined attribute set of the elements which the system automatically detects and identifies. The present invention will prove essential when re-architecture of the software application is necessary because it provides the maximum level of ease and the lowest cost for migrating the old automated tests to run against the newly architected software application. In addition, the present invention provides ease of automation and abstraction for maintenance.

A wide variety of applications and custom tools can be built to leverage the present invention to incorporate in the application life cycle process. For example, development teams can choose to build an early warning system to help predict and identify changes in the SAUT that will affect automated test scripts. Using the present invention, such a system can be built without the need to run all the automated test scripts and analyze their failures (as is done in today's software development cycles). Instead, one could simply validate the abstracted model structure inferred from the altered SAUT against the last known good version they have stored.

By providing the before mentioned system, method, and computer readable medium, the present invention provides for software testing and validation having increased flexibility and loose coupling between the automated test script and the target element or region being accessed, thereby adapting the script to the dynamic nature of the SAUT.

BRIEF DESCRIPTION OF THE DRAWINGS

Some of the features and benefits of the present invention having been stated, others will become apparent as the description proceeds when taken in conjunction with the accompanying drawings, in which:

FIGS. 3-9 illustrate various embodiments of the present invention.

DETAILED DESCRIPTION OF THE INVENTION

The present invention now will be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Figures 1, 2:
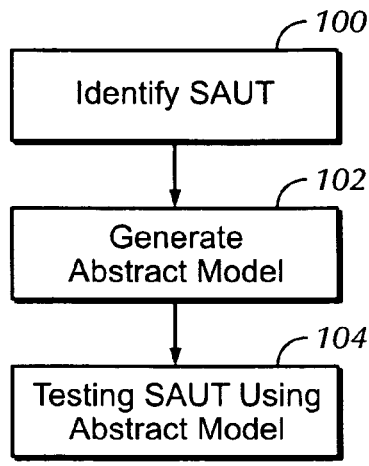
FIG. 1 illustrates a high level flow chart according to an embodiment of the present invention.
FIG. 2 illustrates an exemplary mark up language according to an embodiment of the present invention.

Referring to FIG. 1, an exemplary embodiment of a high level flow chart of the present invention is illustrated. As shown, the present invention will first identify a software application to be tested, or a software application under test (i.e., SAUT) at step 100. The SAUT can be any form of software conceivably used within the scope of this invention, including markup languages. Once identified, the system will then generate an abstract model based upon the SAUT at step 102. This model can include all or a portion of the SAUT, which ever is desired. Also, as will be discussed later, the abstract model will include data which allows the test script to adapt to the nature of the SAUT. Once the model has been generated, the system will proceed with testing the SAUT with a test script using the abstract model at step 104.

In regard to FIGS. 1-9, a method of defining an abstracted model of a markup application will now be described. For example, a particular SAUT 20 is an application persisted using a markup language and is shown in FIG. 2. The markup language is then interpreted using hosts that present users with data and user interface elements in which users can interact with. Examples of common markup languages are HTML, XML, XHTML, CHTML, XAML, etc. There are slight differences between some of these markup languages in terms of rules of persistence, however, all share the common characteristics of being able to present a hierarchy structure to define the application they are describing or data they are persisting. Although other software languages may be envisioned within the scope of this invention, only markup languages will be discussed throughout the subsequent disclosure.

Referring to FIG. 3, generating an abstract model (step 102 of FIG. 1) to use in the automated testing of the present invention can be done using tags 22 to outline the desired abstract model. Tags 22 can be predefined and inserted within SAUT hierarchy to define a specific abstract region 24 or element 26. For example, FIG. 3 illustrates FIG. 2 along with three defined abstract regions 24 that described the overall abstracted model 28.

Referring to FIG. 3, the predefined tag "<testregion . . . >" is inserted in three locations of SAUT 20. It is first inserted to outline the region between line 2 and line 23. This region is identified as "MyApplication" using an 'id' attribute. Two other nested abstract regions 24 are defined. The first starting at line 13 to line 17 and is identified as region "Login," while the other is inserted at line 18 to 21 and is identified as region "DataDisplay." Given that region "Login" and "DataDisplay" are children of "MyApplication" within the application hierarchy, they are also considered children regions of the "MyApplication" region within abstract model 28.

Each abstract region 24 contains a certain set of application elements 26 that become child elements and part of their respective abstract region 24. For example, region "Login" contains three application elements 26. The first element is a <label . . . > element at line 14, the second is an <input type="text" . . . > element at line 15, and the third is an <input type="button" . . . > element at line 16. Moreover, there are no restrictions to the level of nesting and depth of child elements within a region or of regions nested within other regions.

Tags 22 are configurable. Users can, for example, change the tag name from "testregion" to any other text. In addition to the tag name, users can configure the tag itself. For users that don't want to introduce tags into their SAUT test, they can use comment tags to define abstract regions 24. FIG. 4 shows the same application of FIG. 3, but, instead of using well formed tags like <testregion . . . >, the testing software utilizes a markup comment tag 30 of the form <!—testregion . . . —>. The tag name and format of tags 22 are configured as part of the system that will parse the SAUT.

In addition to defining abstract model 28, the present invention allows for optional tagging of specific elements within each abstract region 24. This allows the tagged elements to be auto discoverable by the system and available for direct access by test scripts. This also enables a uniform tagging scheme for abstracting the application and tagging its specific elements, which is used by the automated test scripts. In FIG. 3, three application elements 26 are tagged with a "testObject" attribute that signifies to the system this element needs to be auto detected and readily available from within its contained abstracted region 24. Any elements which are tagged, but do not exist in the abstracted region, will be ignored by the system. For example, the "testObject" attribute value is the unique identifier of that element within its abstracted region. If the "testObject" value is empty, the element is ignored and will not be auto detected by the system.

Figure 5:
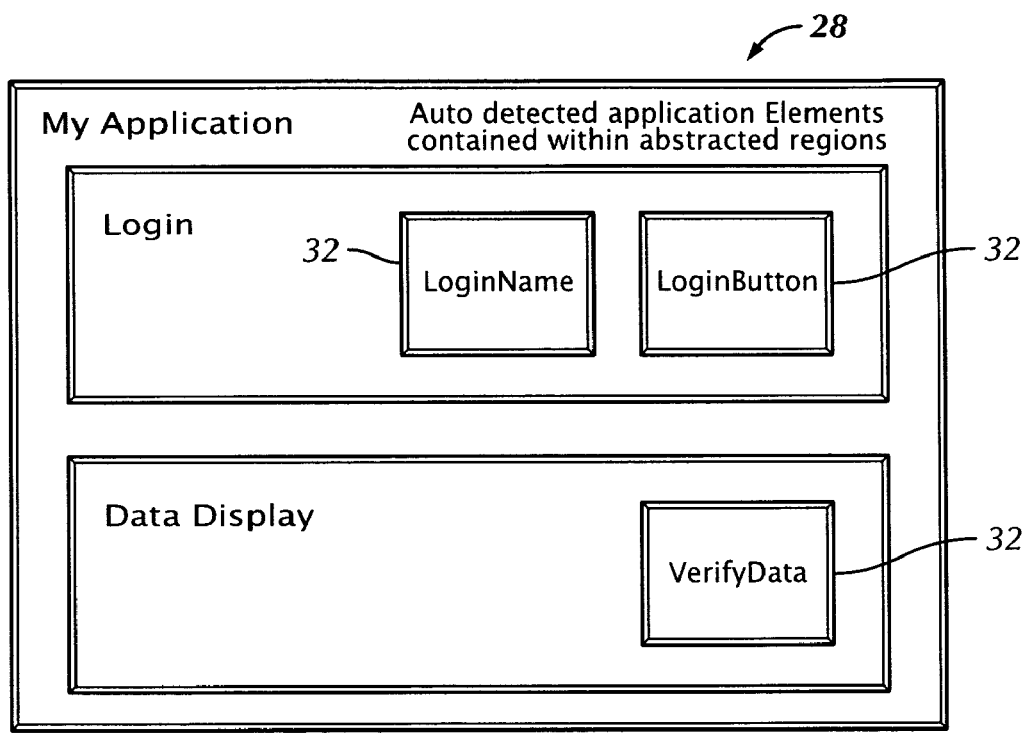

In FIGS. 3 and 5, three auto discoverable elements are defined. The first is at line 15 within the "Login" region and is identified as "LoginName" by setting the testObject attribute value to "LoginName." The second is at line 16 and is also within the "Login" region and is identified as "LoginButton." The third and last element is at line 20 and is identified as "VerifyData." By defining these elements, they will be readily available and accessible using their identifier directly from their parent abstracted region.

FIG. 5 illustrates a block diagram of the overall abstracted model 28 and its associated auto discoverable elements 32 that can be accessed as defined by FIG. 3. For application elements that are not fixed and inaccessible, such as dynamically generated languages like ASP.NET, the elements can then be identified using identification rules which are part of the system and are described later in this disclosure.

After abstracted model 28 and auto discoverable elements 32 are defined using the above method, the system can utilize this data to provide automated test scripts which run against SAUT 20 with an abstraction layer without any additional cost of building that layer. In addition, the test scripts using the abstracted model 28 will be tied to the abstraction regions regardless of where they are defined or located within the SAUT. This results in a test script having a loose dependency on the SAUT, thus providing the test scripts with added resiliency when dealing with application updates and changes outside of abstracted regions 24.

The present invention implements the method described above using a component called the "TreeBuilder" and two entities: a "TestRegion" and a "TestObject." These components combined provide the automated test scripts with the access it needs to abstracted model 28 and auto discoverable elements 32.

When the test scripts execute the application, it passes its output to the "TreeBuilder." The "TreeBuilder" contains a markup parser that processes each markup element in the output of the test script. Each time "TreeBuilder" encounters a <testregion . . . > tag, it will build a TestRegion object representing its respective abstracted region and add it to a flat list of TestRegion collection. The TestRegion collection is directly accessible from the TreeBuilder using the region identifier which is set using the ID attributed on a testregion tag. The TestRegion object stores information about:
1) The test region location within the application;
2) The parent region that this region is contained in (if any);
3) A collection of sub-regions that might be contained in that region;
4) A reference to all elements contained in that region; and
5) A collection accessible directly by an identifier of all elements that have been tagged with "testObject" to be auto detected by the system. These elements are stored as "TestObject" entities in a collection.

Figure 6:
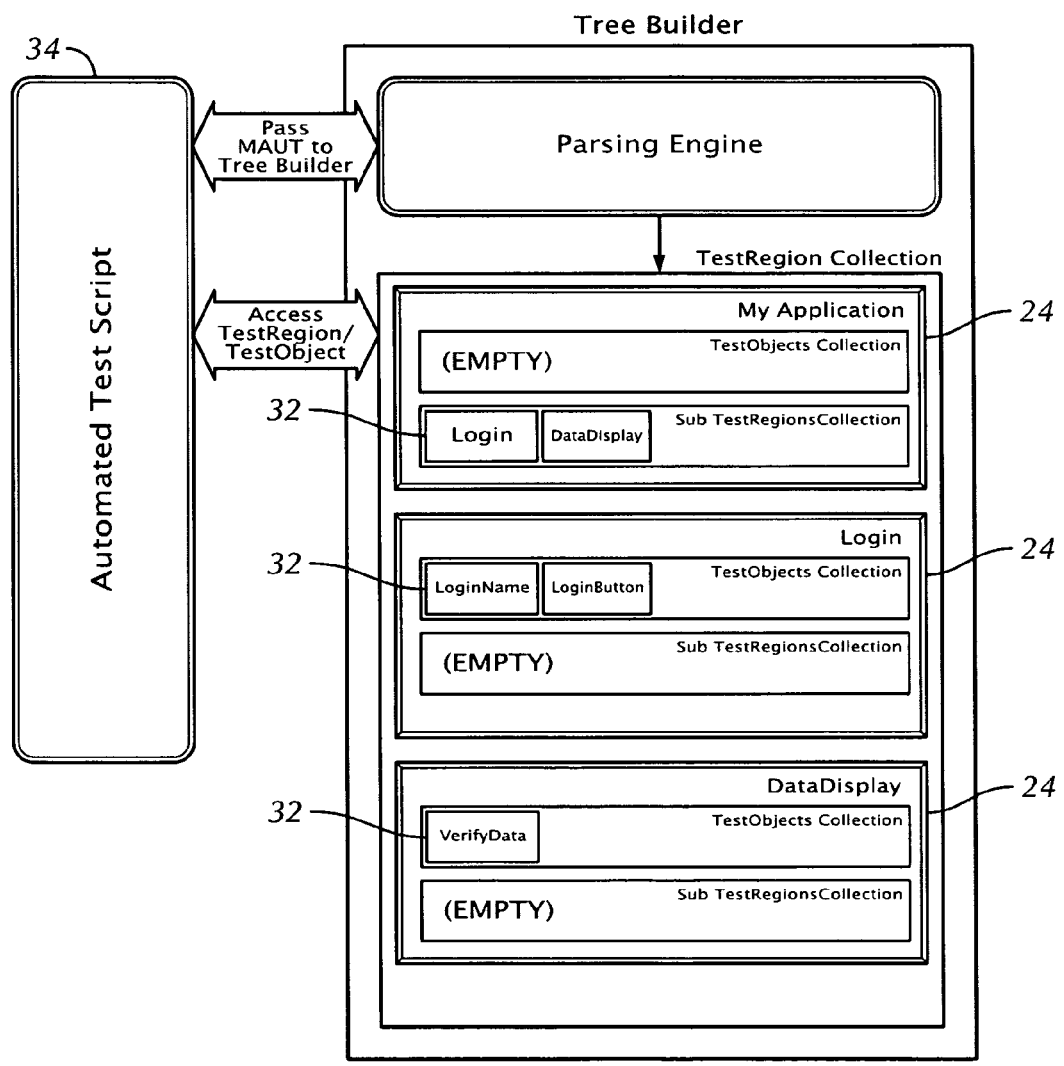

Referring to FIG. 6, an exemplary embodiment of a structure of the TestRegions and TestObjects built by the TreeBuilder when processing the markup output modeled in FIG. 3. Note each TestRegion reflects each abstract region 24 of FIG. 3. FIG. 6 also shows the internal collection of TestObjects built directly within each TestRegion. Also note each TestObject reflects each auto discoverable element 32 of FIG. 3.

Figure 7:
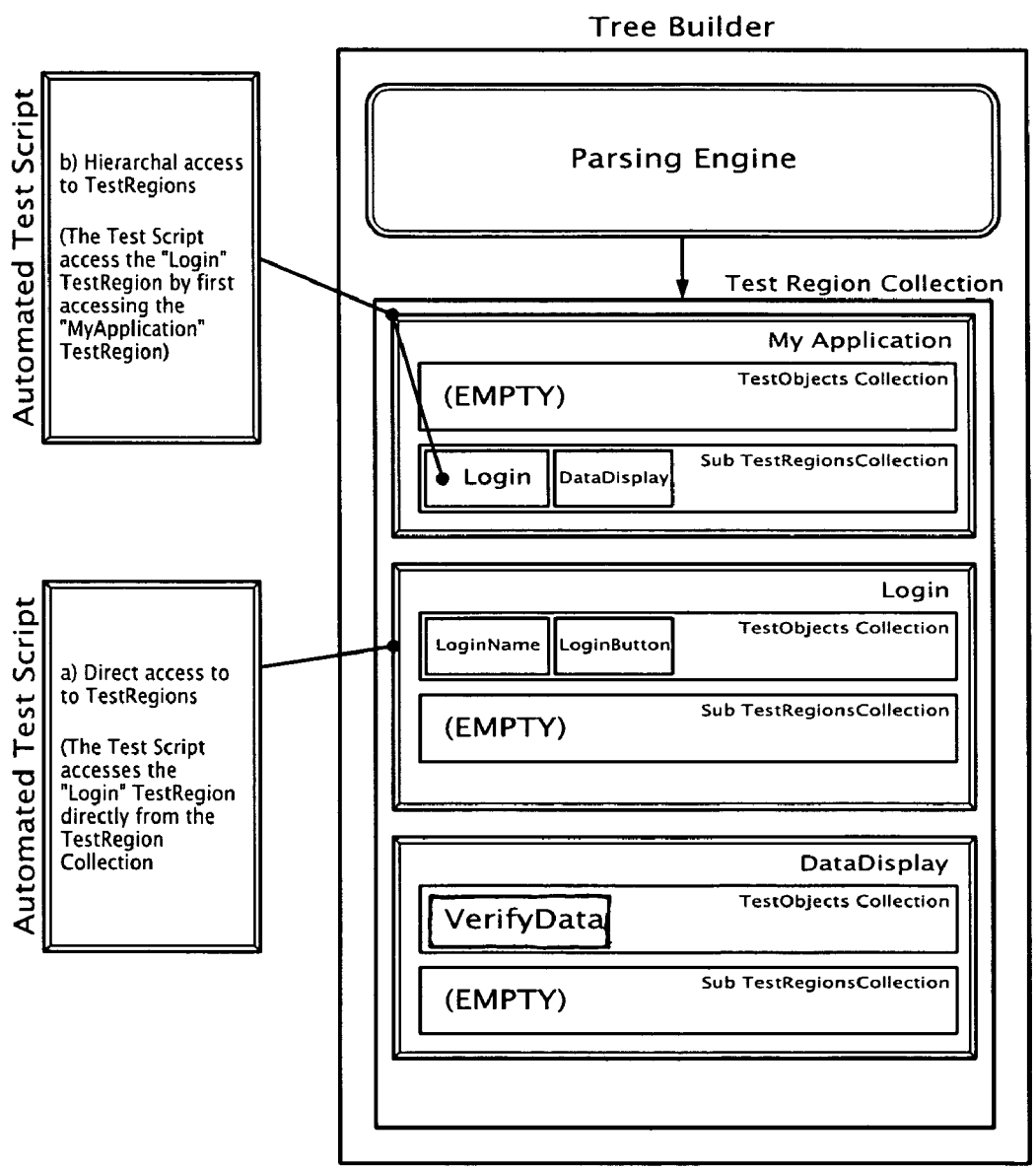

Referring to FIGS. 6 and 7, test script 34 can then navigate abstracted model 28 by either a) directly accessing the TestRegion collection using its identifier, which will locate the TestRegion regardless its location within abstracted model 28, or b) given that each TestRegion entity contains a method to navigate abstracted model 28 up or down the hierarchy, the test script 34 can choose to navigate the model 28 using the model's hierarchy (i.e., hierarchy access). Users can do this to ensure a certain model's integrity is present in the SAUT. For example, in FIG. 6, test script 34 can access the abstracted region 24 named "Login" by either directly asking for "Login" from the TreeBuilder or first asking for "MyApplication" and then asking the "MyApplication" TestRegion object for its sub-region identified as "Login." The latter method allows for ensuring the integrity of abstracted model 28 where the "Login" region is contained inside "MyApplication." Note that accessing regions using the latter approach will result in the test script having a tighter bond to the structure of abstracted model 28.

Once test script 34 has access to its desired portion of the SAUT represented as an abstracted TestRegion entity, test script 34 will need to access a specific element contained within that region in order to invoke actions on or to verify its output.

Test script 34 can use the system's Identification Engine to access the elements within the various TestRegions. The identification engine returns an element to automated test script 34 as a TestObject entity. A TestObject entity can represent any element in the SAUT 20. If the element is auto detected, the TestObject's auto detected property will be set to true; otherwise, the TestObject auto detected property will be set to false. A TestObject entity contains the following essential information regarding an element:
   a) The parent TestRegion object that it is contained in (if any); and
   b) A reference to the element that this TestObject represents. The reference is represented as either 1) an absolute index of this element within the entire SAUT element's list, or, 2) the tag name index of this element.

These properties provide the essential information that test script 34 can use to access the elements directly from the host that is currently running the application (e.g., Internet Explorer™, XMLDocument™, etc.). Almost all markup application hosts provide a standard access method to elements using the above information. The system uses this information as the standard set of information to return to test script 34 so it can identify the element and invoke actions on or verify output for these elements.

Accessing elements from a TestRegion object using the "identification engine" can be performed in two ways:
   1. Directly if the element is set for auto detection using the "testObject" property. For example test script 34 can access the <label . . . > element shown in FIG. 3 on line 20 by first accessing the TestRegion that this element is contained in (which is: DataDisplay) and then using the TestObject collection that this region contains, test script 34 can access the '<label id="myLabel" . . . >' test object using its auto detect identifier which is "VerifyData". FIG. 7 shows the internal collections built for SAUT 20 defined in FIG. 3. Test scripts 34 can first access the "DataDisplay" test region, then access its TestObject collection which contains the "VerifyData" TestObject; and
   2. If the element is not set for auto detection, test script 34 can use one of the four identification rules that the identification engine supports. The identification rules provide the test scripts with a rich and a flexible identification mechanism to choose from. The rules are customizable to fit the nature and the characteristics of the SAUT. Test script 34 can also mix these rules to identify any element in a chained identification scheme that is described later in this document.

For each rule the Identification Engine requires two pre-requisites:
   1. A reference to an element in the tree to use as a starting point for the search. This reference can be passed to the identification engine as either a TestRegion entity where the search should start or an explicit element represented as a TestObject. When a TestRegion is passed, the identification engine extracts the exact element that this TestRegion starts at and uses it as a starting point; and
   2. The target tag name for the element that you desire to find. This is used as a validation to the success of the search at the end before returning the found element. This is optional. Once these two pre-requisites are met, the rule will return the first element it encounters which matches the identification requirements.

The first identification rule provided by the system is the Hierarchy Identification Rule: This rule searches for an element using a hierarchy path specified as a string with "/" delimited list of integers. Each "/" represents one depth in the hierarchy and the integer identifies the zero indexed child element within that hierarchy level.

FIG. 8 shows an example of how the identification rule can be used to identify a specific element. In this example, the script identifies the link element <a . . . > on line 34. (The element refers to the date "September 30" on a calendar that the script needs to click). The script passes the hierarchy identification rule with string "0/2/6/0" and a starting point as TestRegion: "myCalendar". The script also passes the tag name of the target element which is "a".

The identification rule embodied in the system starts by splitting the string into a list of four integers "0", "2", "6" and "0". The rule then starts with the left most integer in the list which is "0" and starts by identifying the "0" indexed child element under the starting element TestRegion:"myCalendar". The "0" indexed element is <table . . . > at line 2. Once the element identified, the rule processes the next integer in the list which is "2". The rule identifies the element at index "2" under the <table . . . > element, which is the <tr> element on line 27. The rule now processes the integer "6," which is the element <td . . . > at line 34. The rule then processes the last integer which is "0" and refers to the zero indexed child element of <td . . . > which is the <a . . . > element. Once the rule has reached the last integer, it will verify the tag name with the one passed to it which, in this example, will match and the rule will return a reference to this element (using the information described earlier) to the test script so it can access it.

This identification rule is very useful when a markup hierarchy (within a region) is fixed but the element types in that hierarchy, including their attributes and ids, are dynamic or consistently changing within the application and users want to shield their test scripts from these application changes.

The second identification rule provided by the present invention is the Attribute Identification Rule. This rule searches for an element using a certain combination of attributes that are set on each element. The rule can search 1-n attribute combinations. Each combination can be an exact property name/value pairs or property name/partial value pairs.

For example: in FIG. 8, the test scripts can identify the <a . . . > element on line 34, by simply passing in any of the following attribute combinations, in addition to the starting point which is the TestRegion: "myCalendar" and the target tag name which is "a". The following is an example.

Example 1

Exact Property Name/Value Pair title="September 30"
In this example, the rule will check every element contained within the starting point and check each element's attribute list against the one passed in. In FIG. 8, only element <a . . . > on line 34 matches the combination above since it is the only element contained in "myCalendar" that has a property named "title" with a value of "September 30".
Another example is provided below:

Example 2

Property Name/Partial Value Pair href='2464'
In this example, the rule will use the same logic as in Example 1 but instead of checking the exact value of the attribute, it will check for the partial value. Again in FIG. 8, the only element that will match the above pair, is the <a . . . > element on line 34 since it's the only element that has a "href" property with a value that contains the partial string "'2464'".
The Attribute Identification Rule supports n number of attribute pairs. If more than one pair is present then all combinations need to match the element's attributes for it to be considered found. For example, if you use the following pairs:
  Exact (title="September 30")
  Partial (href='2464')
The element on line 34 will be found. If you change the first pair to be title="foo", the element will not found although the partial pair (href='2464') matches. As mentioned above, both pairs need to match for the element to be found.
The third identification rule provided by the present invention is the Tag Index Identification Rule. This is the basic rule that searches a specific tag based on its tag name occurrence. This rule is similar to the standard identification implemented in the core javascript engine and Microsoft HTML Document Object Model. The difference is that this rule takes in, as discussed earlier, a starting point. So the occurrence doesn't always have to be calculated from the root of the markup application, it can start at any element that is passed in as the starting point.
For example, in FIG. 8, we can identify the <a . . . > element on line 34 by simply using this rule and passing in an index of "8" since the <a . . . > element on line 34 is the $9^{th}$ <a . . . > element that occurs starting at TestRegion: "myCalendar" and, hence, has an index of 8. FIG. 9 shows the indices of all the <a . . . > elements contained in FIG. 8. The rule embodied in the system will search each element and every time it encounters an <a . . . > element, it will increment an internal counter. Once the counter matches the indexed passed in the rule, the element will be returned to the test script that requested it.
The fourth identification rule provided by the present invention is the Regular Expression Identification Rule. This rule searches for tags using a regular expression passed to the identification engine as a string. If an element matches the regular expression passed in, it is returned as the found element. You have the option to match the element with a) all its contents or b) simply the element starting tag.

For example, in FIG. 8, you can simply identify the <a . . . > element on line 34 by using this rule with the following regular expression: "<a*>30</a>" with the option of matching the element will all its content. Where, in another example, you can identify the <a . . . > element on line 34 by using this rule with the following regular expression: "<a*'2464'*>" with the option of matching only element starting tag. The rule tests each element contained within the TestRegion: "myCalendar" against the regular expression passed in and given the options set. Once a match is found the element is returned to the test script as the found element.

In another exemplary embodiment of the present invention, the rules above can be mixed and matched to offer an even more powerful and flexible identification scheme called an identification chain. The system supports identifying an element using multiple configured rules from the set described above. Each rule can be used to identify a segment of the path to the targeted element. For example, in FIG. 8 we can use a chained set of rules to identify the <a . . . > element on line 34. For example, we will use a Hierarchy Rule to first identify the <tr> element on line 27, then use an Attribute Rule to identify the <a . . . > element on line 34. The Hierarchy Rule will have a hierarchy string:"0/2" and a starting point TestRegion: "myCalendar" and a target element tag name "tr". The Attribute Rule will have an exact attribute combination of {title="September 30"} with a starting point as the <tr> element identified by the previous Hierarchy Rule in the identification chain and the target element tag name of "a". The identification system supports passing in 1-n chained rules and will automatically use the found element from previous rule as the starting point element of the next rule until all rules are executed.

It is important to note that while embodiments of the present invention have been described in the context of a fully functional system and method embodying the invention, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and/or instructions related to the system and the method steps described above.

While this invention has been shown in only one of its forms, it should be apparent to those skilled in the art that it is not so limited but is susceptible to various changes without departing from the spirit and scope of the invention. In the drawings and specification, there have been disclosed illustrative embodiments of the invention and, although specific terms are employed, they are used in a generic and descriptive sense only and not for the purpose of limitation, the scope of the invention being set forth in the following claims.

I claim:
1. A computer-implemented method for software testing and validation, the computer-implemented method performing a process of building an abstract model of a software application under test and a process of testing at least one region of the software under test, the method comprising the steps of:

enabling a user to define at least one specific region of the software application under test by tagging at least one hierarchical element and at least one child region of the specific region by tagging at least one child element of the at least one hierarchical element;

enabling a user to tag test objects within the software application under test;

building the abstract model using hierarchical elements, child elements and test objects, the hierarchical elements, child elements and test objects indexing at least one object in the at least one region of the software under test;

executing a test script to test the at least one object in the at least one region by navigating the abstract model using one or more of the following hierarchical element, a child element, and a test object;

altering the software application under test by relocating or redefining the at least one region of the software application under test; and re-executing the test script to test the at least one object in the at least one region by navigating the abstract model using one or more of the following: the hierarchical element, the child element, and the test object, the re-executing performed without regeneration of the abstract model.

2. A computer-implemented method of claim 1, wherein the hierarchical element, child element, and test object is tagged using one of a plurality of predefined identifiers.

3. A computer-implemented method of claim 1, wherein the hierarchical element, child element, and test object is tagged using one of a plurality of user defined identifiers.

4. A computer-implemented method of claim 1, where at least one of the hierarchical element, child element, and test object is tagged using one of a plurality of user defined comments.

5. A computer-implemented method of claim 1, wherein the abstract model is navigated using a plurality of integers, the plurality of integers being assigned to the hierarchical elements and child elements to thereby indicate the location of the test object.

6. A computer-implemented method of claim 5, wherein the test script may access the at least one object using the abstract model of the target object.

7. A computer-implemented method of claim 1, wherein the software application under test is programmed in one of HTML, XML, XHTML, CHTML, or XAML.

8. A computer program product operable on a computer and stored in a non-transitory computer memory for testing and validating software, the computer program product performing a process of building an abstract model of a software application under test and a process of testing at least one region of the software under test, the computer program product comprising the instructions of:

enabling a user to define at least one specific region of the software application under test by tagging at least one hierarchical element and at least one child region of the specific region by tagging at least one child element of the at least one hierarchical element;

enabling a user to tag test objects within the software application under test;

building the abstract model using hierarchical elements, child elements and test objects, the hierarchical elements, child elements and test objects indexing at least one object in the at least one region of the software under test;

executing a test script to test the at least one object in the at least one region by navigating the abstract model using one or more of the following: a hierarchical element, a child element, and a test object;

altering the software application under test by relocating or redefining the at least one region of the software application under test; and re-executing the test script to test the at least one object in the at least one region by navigating the abstract model using one or more of the following: the hierarchical element, the child element, and the test object, the re-executing performed without regeneration of the abstract model.

9. A computer program product of claim 8, wherein the hierarchical element, child element, and test object is tagged using one of a plurality of predefined identifiers.

10. A computer program product of claim 8, wherein the hierarchical element, child element, and test object is tagged using one of a plurality of user defined identifiers.

11. A computer program product of claim 8, wherein at least one of the hierarchical element, child element, and test object is tagged using one of a plurality of user defined comments.

12. A computer program product of claim 8, wherein the abstract model is navigated using a plurality of integers, the plurality of integers being assigned to the hierarchical elements and child elements to thereby indicate the location of the test object.

13. A computer program product of claim 12, wherein the test script may access the at least one object using the abstract model of the target object.

14. A computer program product of claim 8, wherein the software application under test is programmed in one of HTML, XML, XHTML, CHTML, or XAML.

15. A machine for testing and validating a software application under test, the machine defining a computer, the computer having a processor and a non-transitory memory thereon, the computer further comprising:

a computer program product operable on the computer and stored in the non-transitory computer memory for testing and validating software, the computer program product performing a process of building an abstract model of a software application under test and a process of testing at least one region of the software under test, the computer program product comprising the instructions of:

enabling a user to define at least one specific region of the software application under test by tagging at least one hierarchical element and at least one child region of the specific region by tagging at least one child element of the at least one hierarchical element;

enabling a user to tag test objects within the software application under test;

building the abstract model using hierarchical elements, child elements and test objects, the hierarchical elements, child elements and test objects indexing at least one object in the at least one region of the software under test;

executing a test script to test the at least one object in the at least one region by navigating the abstract model using one or more of the following: a hierarchical element, a child element, and a test object;

altering the software application under test by relocating or redefining the at least one region of the software application under test; and re-executing the test strip to test the at least one object in the at least one region by navigating the abstract model using one or more of the following: the hierarchical element, the child element, and the test object, the re-executing performed without regeneration of the abstract model.

16. A machine according to claim 15, wherein the hierarchical element, child element, and test object is tagged using one of a plurality of predefined identifiers.

17. A machine according to claim 15, wherein the hierarchical element, child element, and test object is tagged using one of a plurality of user defined identifiers.

18. A machine according to claim 15, wherein at least one of the hierarchical element, child element, and test object is tagged using one of a plurality of user defined comments.

19. A machine according to claim 15, wherein the abstract model is navigated using a plurality of integers, the plurality of integers being assigned to the hierarchical elements and child elements to thereby indicate the location of the test object.

20. A machine according to claim 19, wherein the test script may access the at least one object using the abstract model or the target object.

21. A machine according to claim 15, wherein the software application under test is programmed in one of HTML, XML, XHTML, CHTML, or XAML.

* * * * *

UNITED STATES PATENT AND TRADEMARK OFFICE
CERTIFICATE OF CORRECTION

| | | |
|---|---|---|
| PATENT NO. | : 7,934,201 B2 | Page 1 of 1 |
| APPLICATION NO. | : 11/598519 | |
| DATED | : April 26, 2011 | |
| INVENTOR(S) | : Faris Sweis | |

It is certified that error appears in the above-identified patent and that said Letters Patent is hereby corrected as shown below:

In the abstract, delete the word "theses" and insert the word -- these --.

Col. 1, line 25 delete the word "relay" and insert the word -- rely --.

Col. 3, line 54 after the word "SAUT" insert the word -- and --; line 55 delete the word "user's" and insert the word -- user --.

Col. 9, line 37 after the word "not" insert the word -- be --.

Col. 11, line 19 after the word "following" insert a -- : --; line 37 delete the word "where" and insert the word -- wherein --.

Signed and Sealed this
Fifth Day of July, 2011

David J. Kappos
*Director of the United States Patent and Trademark Office*